(12) United States Patent
Gowda et al.

(10) Patent No.: US 12,691,894 B2
(45) Date of Patent: Jul. 28, 2026

(54) VEHICULAR DRIVER MONITORING SYSTEM WITH DRIVER INTERACTION

(71) Applicant: Magna Electronics Inc., Auburn Hills, MI (US)

(72) Inventors: Jagadish Narayan Gowda, Bengaluru (IN); Pruthu Manderwad, Karnataka (IN)

(73) Assignee: Magna Electronics Inc., Auburn Hills, MI (US)

( * ) Notice: Subject to any disclaimer, the term of this patent is extended or adjusted under 35 U.S.C. 154(b) by 14 days.

(21) Appl. No.: 19/011,840

(22) Filed: Jan. 7, 2025

(65) Prior Publication Data

US 2025/0229797 A1     Jul. 17, 2025

Related U.S. Application Data

(60) Provisional application No. 63/619,802, filed on Jan. 11, 2024.

(51) Int. Cl.
| | |
|---|---|
| *B60W 50/14* | (2020.01) |
| *B60R 1/12* | (2006.01) |
| *B60R 1/29* | (2022.01) |
| *B60W 40/08* | (2012.01) |
| *G06F 40/20* | (2020.01) |
| *G06V 20/59* | (2022.01) |
| *G06V 40/10* | (2022.01) |

(52) U.S. Cl.
CPC .............. *B60W 50/14* (2013.01); *B60R 1/12* (2013.01); *B60R 1/29* (2022.01); *B60W 40/08* (2013.01); *G06F 40/20* (2020.01); *G06V*

20/597 (2022.01); *G06V 40/10* (2022.01); *B60R 2001/1253* (2013.01); *B60W 2040/0827* (2013.01); *B60W 2040/089* (2013.01); *B60W 2420/403* (2013.01); *B60W 2540/21* (2020.02); *B60W 2540/229* (2020.02); *B60W 2556/10* (2020.02); *B60W 2556/45* (2020.02)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |

(Continued)

*Primary Examiner* — Fekadeselassie Girma
(74) *Attorney, Agent, or Firm* — HONIGMAN LLP

(57) ABSTRACT

A vehicular driver monitoring system includes an interior-viewing camera disposed at a vehicle and viewing at least a head region of a driver of the vehicle. An electronic control unit (ECU) includes a data processor. Image data captured by the interior-viewing camera is transferred to the ECU and is processed at the ECU. Based at least in part on processing at the ECU of image data captured by the interior-viewing camera, the vehicular driver monitoring system monitors the driver of the vehicle. At least partially responsive to monitoring the driver of the vehicle, the vehicular driver monitoring system, using a chatbot, engages the driver in conversation.

22 Claims, 2 Drawing Sheets

(56)                   References Cited

U.S. PATENT DOCUMENTS

| | | | |
|---|---|---|---|
| 9,405,120 B2 | 8/2016 | Graf et al. | |
| 10,017,114 B2 | 7/2018 | Bongwald | |
| 10,065,574 B2 | 9/2018 | Tiryaki | |
| 10,071,687 B2 | 9/2018 | Ihlenburg et al. | |
| 10,099,614 B2 | 10/2018 | Diessner | |
| 10,958,830 B2 | 3/2021 | Koravadi | |
| 11,518,401 B2 | 12/2022 | Kulkarni | |
| 11,582,425 B2 | 2/2023 | Liu | |
| 11,639,134 B1 | 5/2023 | Huizen et al. | |
| 11,780,372 B2 | 10/2023 | Sobecki et al. | |
| 11,827,153 B2 | 11/2023 | Miller et al. | |
| 12,534,021 B2 * | 1/2026 | Sobecki | B60R 1/12 |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0209647 A1 | 7/2016 | Fursich | |
| 2017/0217367 A1 | 8/2017 | Pflug et al. | |
| 2017/0274906 A1 | 9/2017 | Hassan et al. | |
| 2017/0330044 A1 * | 11/2017 | Telpaz | B60H 1/00357 |
| 2018/0222414 A1 | 8/2018 | Ihlenburg et al. | |
| 2018/0231976 A1 | 8/2018 | Singh | |
| 2019/0210615 A1 | 7/2019 | Caron et al. | |
| 2020/0143560 A1 | 5/2020 | Lu et al. | |
| 2020/0202151 A1 | 6/2020 | Wacquant | |
| 2020/0320320 A1 | 10/2020 | Lynam | |
| 2021/0110217 A1 * | 4/2021 | Gunel | G06V 20/56 |
| 2021/0155167 A1 * | 5/2021 | Lynam | B60R 1/12 |
| 2021/0232901 A1 * | 7/2021 | Rundo | G06N 3/094 |
| 2021/0291739 A1 | 9/2021 | Kasarla et al. | |
| 2021/0323473 A1 | 10/2021 | Peterson et al. | |
| 2022/0242438 A1 | 8/2022 | Sobecki et al. | |
| 2022/0254132 A1 | 8/2022 | Rother | |
| 2022/0377219 A1 | 11/2022 | Conger et al. | |
| 2023/0347903 A1 * | 11/2023 | Katz | G06V 20/597 |
| 2024/0112337 A1 * | 4/2024 | Wacquant | G06V 20/52 |
| 2024/0168355 A1 | 5/2024 | Baur | |
| 2024/0190456 A1 * | 6/2024 | P | B60W 50/16 |
| 2024/0362932 A1 * | 10/2024 | Hassan | G06V 10/95 |
| 2024/0383406 A1 | 11/2024 | Sobecki | |
| 2025/0061734 A1 * | 2/2025 | Potnis | G06V 10/774 |
| 2025/0229797 A1 * | 7/2025 | Gowda | B60W 40/08 |
| 2025/0371973 A1 * | 12/2025 | Gupta | G08G 1/005 |
| 2026/0048738 A1 * | 2/2026 | Gowda | B60W 30/09 |

* cited by examiner

VEHICULAR DRIVER MONITORING SYSTEM WITH DRIVER INTERACTION

CROSS REFERENCE TO RELATED APPLICATION

The present application claims the filing benefits of U.S. provisional application Ser. No. 63/619,802, filed Jan. 11, 2024, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular driver monitoring system includes an interior-viewing camera disposed within a cabin of a vehicle equipped with the vehicular driver monitoring system. The interior-viewing camera views at least a head region of a driver of the vehicle, and the interior-viewing camera is operable to capture image data. The interior-viewing camera includes an imager, and the imager includes a CMOS imaging array having at least one million photosensor elements arranged in rows and columns. The system includes an electronic control unit (ECU), with electronic circuitry and associated software. The electronic circuitry includes an image processor operable to process image data captured by the interior-viewing camera. Image data captured by the interior-viewing camera is transferred to and is processed at the ECU. Based at least in part on processing at the ECU of image data captured by the interior-viewing camera, the vehicular driver monitoring system monitors the driver of the vehicle. At least in part responsive to monitoring the driver of the vehicle, the vehicular driver monitoring system, using a chatbot, engages the driver in conversation.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or alert system operates to capture images interior of the vehicle and may process the captured image data to detect objects within the vehicle, such as for a driver monitoring system. The vision system includes an image processor or image processing system that is operable to receive image data from one or more cameras and provide an output to a driver monitoring system or other driver assistance system. Optionally, the vision system may provide a display, such as a rearview display or a top down or bird's eye or surround view display or the like. The vision system may also include a chatbot, which is a computer program that simulates human conversation with the driver, and that may use conversational artificial intelligence (AI) techniques to process the driver's speech and generate appropriate responses. The chatbot may aim to enhance the driver's safety by engaging the driver in conversation when the driver's attentiveness or drowsiness levels are low, and by providing suggestions or warnings to the driver.

Figure 1:
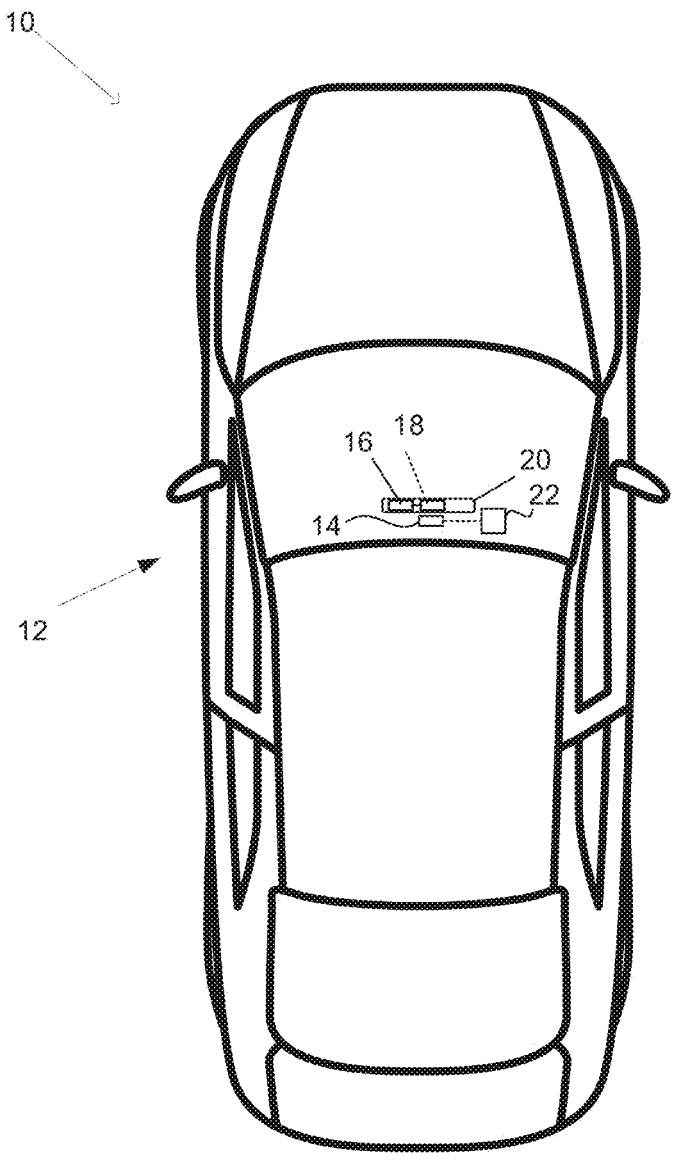
FIG. 1 is a plan view of a vehicle with a vision system that incorporates cameras.

Referring now to the drawings and the illustrative embodiments depicted therein, a vehicle 10 includes an imaging system or vision system 12 that includes at least one interior viewing imaging sensor or camera, such as a driver monitoring and/or occupant monitoring camera 14a (and the system may optionally include multiple interior viewing imaging sensors or cameras, such as a driver monitoring camera and an occupant monitoring camera), which captures images interior of the vehicle, with the camera having a lens for focusing images at or onto an imaging array or imaging plane or imager of the camera (FIG. 1). The camera may be configured to capture images of the driver's head region, including the driver's eyes, face, and head pose, as well as the driver's mouth and/or breathing patterns, which may be used to determine the driver's attentiveness and drowsiness levels. The camera may also capture images of other occupants or objects in the vehicle, such as passengers, pets, or personal belongings, which may be used to determine the occupancy status and the safety conditions of the vehicle. The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like (although shown in FIG. 1 as being part of or incorporated in or at an interior rearview mirror assembly 20 of the vehicle, the control and/or the camera may be disposed elsewhere at or in the vehicle). The data transfer or signal communication from the camera to the ECU may comprise any suitable data or communication link, such as a vehicle network bus or the like of the equipped vehicle.

The ECU may also include or execute a chatbot module that includes a natural language processing (NLP) component and a text-to-speech (TTS) and speech-to-text (STT) component. The NLP component may be operable to process spoken words from the driver or other occupants of the vehicle and to automatically generate responses to the spoken words, using a language model that incorporates conversational AI techniques. The TTS and STT components may be operable to convert text to audible speech and vice versa, using a speaker and a microphone disposed within the vehicle, respectively. The chatbot module may be operable to initiate and maintain a conversation with the driver, using the NLP, TTS, and STT components, based on the driver's attentiveness and drowsiness levels and other factors.

Implementations herein are directed toward a driver monitoring system (DMS) and/or an occupant monitoring system (OMS). The system, using an interior mounted camera 14, monitors a driver for inattention, distractions, and/or drowsiness. For example, the system regularly determines a current drowsiness of the driver of the vehicle (e.g., based on the driver's eyes, the driver's face/head, the driver's breathing, etc.) and, when the current drowsiness of the driver satisfies a drowsiness threshold value, the system performs an action. The actions may include a visual, audible, or haptic warning or notification of the drowsiness. The actions may include engaging the driver in conversation using the chatbot module, as described below. The system may monitor the driver's attentiveness by detecting the driver's head pose, eye gaze, blink rate, facial expressions, and other indicators of the driver's focus and alertness. The system may monitor the driver's emotions, mood, preferences, and personality, by analyzing the driver's speech, tone, and facial expressions, and by using a profile associated with the driver that stores such information. Optionally, the system uses the information obtained from monitoring the driver to tailor the chatbot's responses and topics to the driver's needs and interests.

The chat bot 22 may be integrated with or otherwise in communication with the DMS. A chat bot is a computer program that simulates human conversation with a user (i.e., the driver). The chatbot may include or use a model that incorporates conversational artificial intelligence (AI) techniques such as natural language processing to process spoken words from the driver or other occupants of the vehicle and to automatically generate responses to the spoken words. The chatbot may include text-to-speech and speech-to-text capabilities to audibly converse with the driver while the driver drives the vehicle. Optionally, the chatbot interfaces with a large language model (LLM) or the like. For example, speech from an occupant of the vehicle and captured by a microphone disposed within the vehicle may be converted to text using known techniques and provided as a prompt to the LLM or other model. The model, in response to the prompt, generates a response that the system may convert to audible speech and provided to the occupant (e.g., via playing on a speaker disposed within the vehicle).

The chatbot may use a language model that is trained on a large corpus of text data (e.g., an LLM) that can generate coherent and relevant responses to various prompts and contexts. The chatbot may also use a knowledge base that stores information on various topics, such as sports, hobbies, news, weather, etc., that can be used to enrich the chatbot's responses and to provide the driver with useful or interesting information. The chatbot may also use a dialogue manager that controls the flow and structure of the conversation, such as by selecting the appropriate response type, tone, and content, based on the driver's input, state, and profile.

Figure 2:
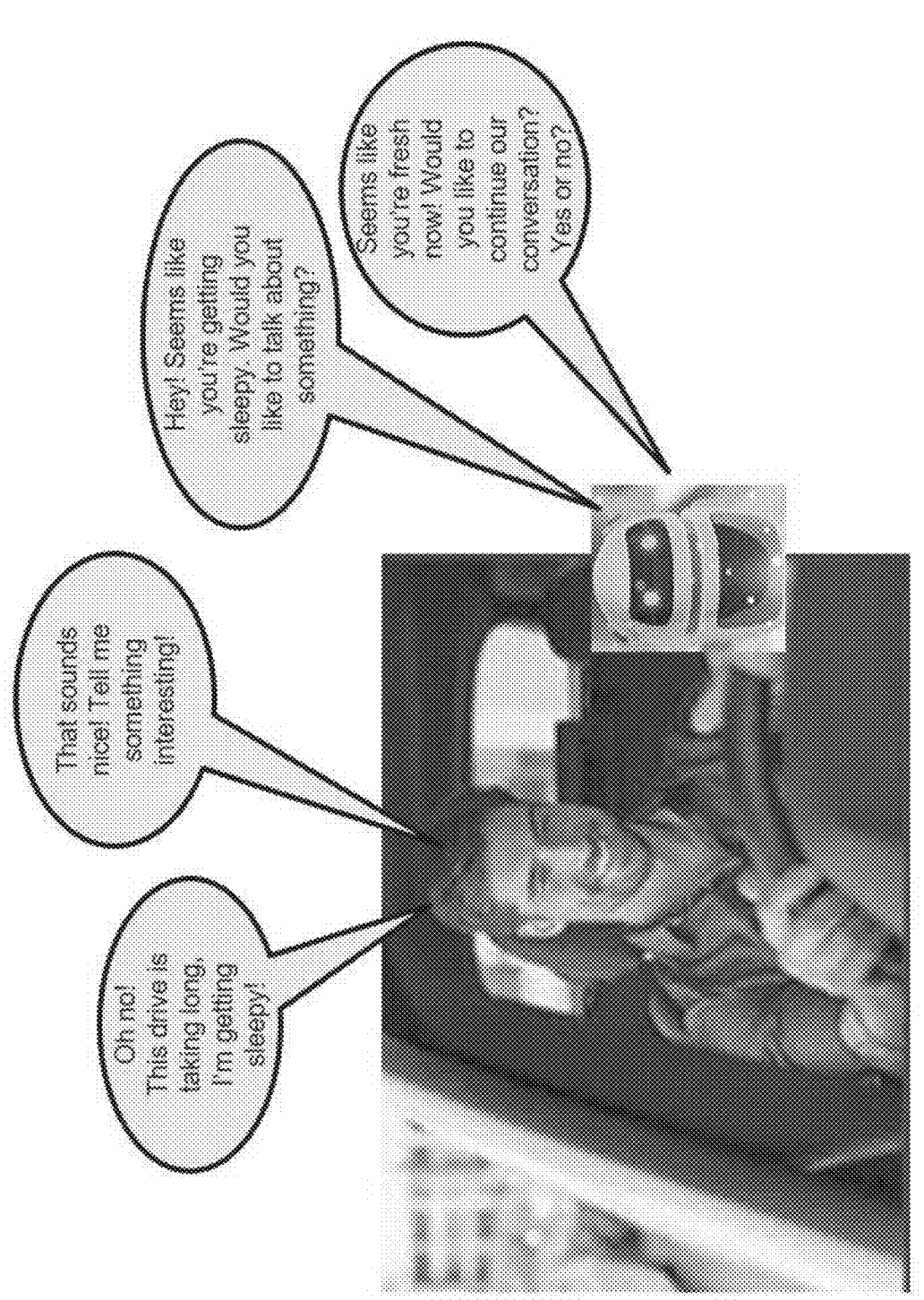
FIG. 2 is a perspective view of the vision system of FIG. 1 engaging a driver of a vehicle in conversation.

Referring now to FIG. 2, when the system determines that the driver has a threshold amount of drowsiness, distraction, or other features, the system, using the chatbot, may engage the driver in conversation. For example, the system may provide suggestions to the driver, such as a suggestion to take a break for a coffee or for a nap. The system may initiate the conversation using a default prompt or other greeting and then provide the driver's response to the chatbot/model to carry on the conversation. In other examples, the system, when initiating the conversation, provides context to the chatbot (e.g., a reason for initiating the conversation, learned preferences associated with the driver, current events associated with the driver or vehicle, etc.) so that the chatbot generates an appropriate initial prompt for the driver. For example, the system may say "Hello, I noticed that you are feeling sleepy. Do you want to talk about something to keep you awake?" or "Hi, I see that you are driving to Chicago. Do you want to hear some fun facts about the city?" or "Hey, I heard that you like music. Do you want to play a trivia game about your favorite songs?"

In some examples, the system attempts to initiate a back-and-forth conversation with the driver to simulate or mimic conversation with another passenger in the vehicle in order to engage the driver. For example, the system, in response to determining that the driver is suitably drowsy or inattentive, asks the driver whether the driver would like to have a conversation. In the example of FIG. 2, the system, via an audible prompt to the driver, asks "Hey! Seems like you are getting sleepy. Would you like to talk about something?" The system may then listen (i.e., using a microphone) and, based on the driver's response, generate additional messages for the driver. Due to the nature of the chatbot and/or LLM, the system may mimic the conversational skills of a human to engage the driver in an attempt to overcome drowsiness or other distractions. The system could ask questions in response to the driver's prompts (e.g., "You like football? Can you tell me how to play?"), play simple games with the driver (e.g., trivia quizzes), or any other types of verbal interactions. The system may provide feedback, encouragement, humor, and/or empathy to the driver, depending on the driver's mood and state. For example, the system may say "Wow, you are very good at this game. You must be a big fan of music." or "I'm sorry to hear that you had a bad day. Do you want to talk about it?" or "That's a funny joke. You have a great sense of humor."

The system may have personalized settings for particular drivers (e.g., stored at a profile associated with the driver). For example, the system may maintain a conversation history for each driver (e.g., at a profile) and base the conversation off the history. The system may offer personalization options for each driver. For example, the system may store preferences on the types or categories or topics of questions asked, the types of games played, the driver's responses and/or drowsiness/inattentiveness levels based on the responses, the drowsiness/inattentiveness thresholds, whether the system should activate when other occupants are in the vehicle, etc. For example, the system may determine that a particular topic or game or question(s) increases the driver's attentiveness or decreases the driver's drowsiness more or less than a different particular topic or game or question(s) and tailor the conversation appropriately. The system may determine and automatically engage when the system detects that the driver is alone in the vehicle or the front of the vehicle. For example, the system may store a favorite sports team or favorite hobbies as topics associated with the user and direct questions or facts toward the stored topics. The system may use wireless communication to retrieve information (e.g., via the Internet) information regarding the stored topics. For example, the system may look up recent news on the topics or history on the topics and tailor the conversational experience with the driver toward the recent news or history. The system may disengage in response to a command from the driver and/or when the system determines that the driver's attentiveness or drowsiness levels have returned to accepted levels.

Optionally, the system may change topics based on feedback from the driver. For example, if the system determines that the driver's drowsiness is not decreasing sufficiently (e.g., more than a threshold amount) based on the current topic, the system may switch to a different topic to better engage the driver. Alternatively, the driver may request a change in topic if they find the current conversation uninteresting or unhelpful. For example, the driver might say, "Can we talk about something else?" and the system would then shift the conversation to a new subject. The system may learn from the driver's feedback and behavior and update the profile accordingly.

The system may use wireless communication to retrieve information (e.g., via the Internet) information regarding the stored topics. For example, the system may look up recent news on the topics or history on the topics (e.g., via retrieval augmented generation (RAG) or the like) and tailor the conversational experience with the driver toward the recent news or history. The system may also learn from the driver's feedback and behavior and update the profile accordingly. For example, the system may ask the driver to rate the conversation or the chatbot's performance and use the rating to improve the chatbot's responses and topics. The system may also detect the driver's satisfaction or dissatisfaction with the conversation or the chatbot's responses and use the detection to adjust the chatbot's tone and content.

While at least some portions of the system execute at the vehicle (e.g., on an ECU disposed within the vehicle), a portion of the system may operate remotely from the vehicle. For example, the chatbot or LLM may execute on a server remote from the vehicle and in wireless communication with the vehicle. In this example, the system may capture the driver's input and wirelessly transmit the prompts to the LLM (e.g., using an application programming interface (API) via the Internet). The model's response or prediction may then be wirelessly provided back to the vehicle. In other examples, the model/chatbot executes on data processing hardware disposed within the vehicle. The system may use encryption and authentication techniques to ensure the security and privacy of the data transmitted between the vehicle and the server. The system may also use compression and optimization techniques to reduce the latency and bandwidth of the data transmission. The system may also use caching and buffering techniques to store and retrieve the data locally at the vehicle or the server, in case of network failures or disruptions.

Thus, implementations herein provide a driving engagement voice chat system that may be integrated into a driver monitoring system or occupant monitoring system. The system may use artificial intelligence tools to mimic human conversation with a driver of the vehicle to ward off drowsiness or inattentiveness. The system may use SDKs/APKs executing on processing hardware of the vehicle and/or in the cloud to leverage these tools for drivers. Thus, the system assists the driver in avoiding hazardous events due to driver distractions and/or drowsiness by creating and maintaining a connection with the drover.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,827,153; 11,780,372; 11,639,134; 11,582,425; 11,518,401; 10,958,830; 10,065,574; 10,017,114; 9,405,120 and/or 7,914,187, and/or U.S. Publication Nos. US-2024-0383406; US-2024-0190456; US-2024-0168355; US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. provisional application Ser. No. 63/673,225, filed Jul. 19, 2024, which published on Jan. 22, 2026 as International Patent Publication No. WO 2026/019985, and/or U.S. provisional application Ser. No. 63/641,574, filed May 2, 2024, which published on Nov. 6, 2025 as International Patent Publication No. WO 2025/231198, and/or International Publication No. WO 2023/220222, which are all hereby incorporated herein by reference in their entireties.

The interior-viewing camera may be disposed at an interior rearview mirror assembly, such as at a mirror head of the interior rearview mirror assembly. The camera may move together and in tandem with the mirror head when the driver of the vehicle adjusts the mirror head to adjust his or her rearward view. The interior-viewing camera may be disposed at a lower or chin region of the mirror head below the mirror reflective element of the mirror head, or the interior-viewing camera may be disposed behind the mirror reflective element and viewing through the mirror reflective element. Similarly, the light emitter may be disposed at the lower or chin region of the mirror head below the mirror reflective element of the mirror head (such as to one side or the other of the interior-viewing camera), or the light emitter may be disposed behind the mirror reflective element and emitting light that passes through the mirror reflective element. The ECU may be disposed at the mirror assembly (such as accommodated by the mirror head), or the ECU may be disposed elsewhere in the vehicle remote from the mirror assembly, whereby image data captured by the interior-viewing camera may be transferred to the ECU via a coaxial cable or other suitable communication line. Cabin monitoring or occupant detection may be achieved via processing at the ECU of image data captured by the interior-viewing camera. Optionally, cabin monitoring or occupant detection may be achieved in part via processing at the ECU of radar data captured by one or more interior-sensing radar sensors disposed within the vehicle and sensing the interior cabin of the vehicle.

The coaxial cable provides bi-directional communication between the mirror head and the ECU that is located at the vehicle remote from the mirror head. For example, the coaxial cable may provide power from the ECU to the mirror head and may provide control signals or data to the mirror head, and may receive image data from the camera at the mirror head. The coaxial cable and electronic connection between the ECU and the mirror head may utilize aspects of the systems described in U.S. Pat. Nos. 10,567,705; 10,298,823; 10,099,614; 10,089,537; 9,900,490 and/or 9,609,757, which are hereby incorporated herein by reference in their entireties. Thus, the bi-directional coaxial cable may commonly carry (i) image data captured by the DMS camera from the mirror head to the ECU, (ii) control signals from the ECU to the mirror head (such as for controlling the camera and/or a light emitter and/or dimming circuitry of the mirror head), and (iii) electrical power from a DC power supply of (or connected to) the ECU to the mirror head.

Optionally, the driver monitoring system may be integrated with a camera monitoring system (CMS) of the vehicle. The integrated vehicle system incorporates multiple inputs, such as from the inward viewing or driver monitoring camera and from the forward-viewing camera, as well as from a rearward-viewing camera and sideward-viewing cameras of the CMS (e.g., a rearward-viewing camera disposed at the rear of the vehicle remote from the rear backup camera of the vehicle, and rearward-viewing cameras disposed at respective sides of the vehicle, such as at respective side-mounted exterior rearview mirror assemblies of the vehicle), to provide the driver with unique collision mitigation capabilities based on full vehicle environment and driver awareness state. The rearward viewing camera may comprise a rear backup camera of the vehicle or may comprise a centrally located higher mounted camera (such as at a center high-mounted stop lamp (CHMSL) of the vehicle), whereby the rearward viewing camera may view rearward and downward toward the ground at and rearward of the vehicle. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2024-0064274; US-2021-0245662; US-2021-0162926; US-2021-0155167; US-2018-0134217 and/or US-2014-0285666, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising: an interior-viewing camera disposed within a cabin of a vehicle equipped with the vehicular driver monitoring system, the interior-viewing camera viewing at least a head region of a driver of the vehicle, wherein the interior-viewing camera is operable to capture image data; wherein the interior-viewing camera comprises an imager, and wherein the imager comprises a Complementary Metal-Oxide-Semiconductor (CMOS) imaging array having at least one million photosensor elements arranged in rows and columns; an electronic control unit (ECU), the ECU comprising electronic circuitry and associated software, wherein the electronic circuitry comprises an image processor operable to process image data captured by the interior-viewing camera; wherein image data captured by the interior-viewing camera is transferred to and is processed at the ECU; wherein, based at least in part on processing at the ECU of image data captured by the interior-viewing camera, the vehicular driver monitoring system monitors the driver of the vehicle; and wherein, at least in part responsive to monitoring the driver of the vehicle, the vehicular driver monitoring system, using a chatbot, engages the driver in conversation.

2. The vehicular driver monitoring system of claim 1, wherein the vehicular driver monitoring system monitors the driver of the vehicle to determine at least one selected from the group consisting of (i) an attentiveness level of the driver and (ii) a drowsiness level of the driver.

3. The vehicular driver monitoring system of claim 1, wherein the vehicular driver monitoring system engages the driver in conversation responsive to determining that a drowsiness level of the driver exceeds a threshold level.

4. The vehicular driver monitoring system of claim 1, wherein the chatbot comprises a language model.

5. The vehicular driver monitoring system of claim 4, wherein the language model comprises a large language model.

6. The vehicular driver monitoring system of claim 4, wherein the language model executes on a server remote from the vehicle, and wherein the vehicular driver monitoring system is in wireless communication with the server.

7. The vehicular driver monitoring system of claim 1, wherein the vehicular driver monitoring system engages the driver in conversation by playing a game with the driver.

8. The vehicular driver monitoring system of claim 1, wherein the vehicular driver monitoring system engages the driver in conversation by asking the driver questions associated with a particular topic.

9. The vehicular driver monitoring system of claim 8, wherein the vehicular driver monitoring system determines the particular topic based on a profile associated with the driver.

10. The vehicular driver monitoring system of claim 8, wherein the vehicular driver monitoring system determines the particular topic based on a preference of the driver.

11. The vehicular driver monitoring system of claim 8, wherein the vehicular driver monitoring system determines the particular topic based on a previous response from the driver.

12. The vehicular driver monitoring system of claim 1, wherein the vehicular driver monitoring system engages the driver in conversation by suggesting the driver take a break from driving the vehicle.

13. The vehicular driver monitoring system of claim 1, wherein the vehicular driver monitoring system engages the driver in conversation based at least in part on determining that the driver is alone in the vehicle.

14. A vehicular driver monitoring system, the vehicular driver monitoring system comprising: an interior-viewing camera disposed within a cabin of a vehicle equipped with the vehicular driver monitoring system, the interior-viewing camera viewing at least a head region of a driver of the vehicle, wherein the interior-viewing camera is operable to capture image data, and wherein the interior-viewing camera is disposed at an interior rearview mirror assembly; wherein the interior-viewing camera comprises an imager, and wherein the imager comprises a Complementary Metal-Oxide-Semiconductor (CMOS) imaging array having at least one million photosensor elements arranged in rows and columns; an electronic control unit (ECU), the ECU comprising electronic circuitry and associated software, wherein the electronic circuitry comprises an image processor operable to process image data captured by the interior-viewing camera; wherein image data captured by the interior-viewing camera is transferred to and is processed at the ECU; wherein, based at least in part on processing at the ECU of image data captured by the interior-viewing camera, the vehicular driver monitoring system monitors the driver of the vehicle; and wherein, at least in part responsive to monitoring the driver of the vehicle, the vehicular driver monitoring system, using a chatbot, engages the driver in conversation.

15. The vehicular driver monitoring system of claim 14, wherein the interior-viewing camera is disposed at a mirror head of the interior rearview mirror assembly.

16. The vehicular driving monitoring system of claim 15, wherein the interior-viewing camera is movable together and in tandem with the mirror head when a driver of the vehicle adjusts his or her rearward view.

17. The vehicular driving monitoring system of claim 15, wherein the mirror head includes a mirror reflective element, and wherein the interior-viewing camera views through the mirror reflective element of the mirror head.

18. The vehicular driving monitoring system of claim 15, wherein the ECU is disposed at the interior rearview mirror assembly.

19. The vehicular driving monitoring system of claim 15, wherein the ECU is disposed at the vehicle at a location that is remote from the interior rearview mirror assembly.

20. A vehicular driver monitoring system, the vehicular driver monitoring system comprising: an interior-viewing camera disposed within a cabin of a vehicle equipped with the vehicular driver monitoring system, the interior-viewing camera viewing at least a head region of a driver of the vehicle, wherein the interior-viewing camera is operable to capture image data, and wherein the interior-viewing camera is disposed at an interior rearview mirror assembly; wherein the interior-viewing camera comprises an imager, and wherein the imager comprises a Complementary Metal-Oxide-Semiconductor (CMOS) imaging array having at least one million photosensor elements arranged in rows and columns; an electronic control unit (ECU), the ECU comprising electronic circuitry and associated software, wherein the electronic circuitry comprises an image processor operable to process image data captured by the interior-viewing camera, and wherein the ECU is disposed at the interior rearview mirror assembly; wherein image data captured by the interior-viewing camera is transferred to and is processed at the ECU; wherein, based at least in part on processing at the ECU of image data captured by the interior-viewing camera, the vehicular driver monitoring system monitors the driver of the vehicle; and wherein, at least in part responsive to monitoring the driver of the vehicle, the vehicular driver monitoring system, using a chatbot, engages the driver in conversation.

21. The vehicular driver monitoring system of claim 20, wherein the interior-viewing camera is disposed at a mirror head of the interior rearview mirror assembly.

22. The vehicular driver monitoring system of claim 20, wherein the ECU is disposed at a mirror head of the interior rearview mirror assembly.

* * * * *